US009020875B1

(12) United States Patent
Compton et al.

(10) Patent No.: US 9,020,875 B1
(45) Date of Patent: Apr. 28, 2015

(54) CATASTROPHE PREDICTION VIA ESTIMATED NETWORK AUTOCORRELATION

(71) Applicant: HRL Laboratories, LLC, Malibu, CA (US)

(72) Inventors: Ryan Compton, Los Angles, CA (US); Hankyu Moon, Oak Park, CA (US); Tsai-Ching Lu, Wynnewood, PA (US)

(73) Assignee: HRL Laboratories, LLC, Malibu, CA (US)

( * ) Notice: Subject to any disclaimer, the term of this patent is extended or adjusted under 35 U.S.C. 154(b) by 277 days.

(21) Appl. No.: 13/747,466

(22) Filed: Jan. 22, 2013

Related U.S. Application Data

(60) Provisional application No. 61/589,786, filed on Jan. 23, 2012, provisional application No. 61/590,391, filed on Jan. 25, 2012, provisional application No. 61/589,634, filed on Jan. 23, 2012.

(51) Int. Cl.
*G06N 5/04* (2006.01)
*G06N 5/02* (2006.01)
*G06N 7/00* (2006.01)

(52) U.S. Cl.
CPC .. *G06N 5/02* (2013.01); *G06N 7/00* (2013.01); *G06N 5/04* (2013.01)

(58) Field of Classification Search
None
See application file for complete search history.

(56) References Cited

PUBLICATIONS

Donges, Functional Network Macroscopes for Probing Past and Present Earth System Dynamics: Complex Hierarchical Interactions, Tipping Points, and Beyond, Doctoral Thesis, University of Berlin, Dec. 13, 2012, pp. 1-259.*
Achlioptas, D.; D'Souza, R.M. & Spencer, J., Explosive Percolation in Random Networks, Science, 2009, 323, 1453-1455.
Buldyrev, S. V.; Parshani, R.; Paul, G.; Stanley, H. E. & Havlin, S., Catastrophic Cascade of Failures in Interdependent Networks, Nature, 2010, 464, 1025-1028.
da Costa, R. A.; Dorogovtsev, S. N.; Goltsev, A. V. & Mendes, J. F. F. Explosive Percolation Transition is Actually Continuous Phys. Rev. Lett., 2010, 105, 255701.

(Continued)

*Primary Examiner* — Wilbert L Starks
(74) *Attorney, Agent, or Firm* — Tope-McKay & Associates

(57) ABSTRACT

Described is a system for catastrophe prediction. The system generates a time series of observables at multiple time steps from data observed from a complex system. A surrogate time series based on the time series of observables is then generated. Inferred network structures for both the time series of observables and the surrogate time series are reconstructed. Next, spatial autocorrelation for each inferred network structure in both the time series of observables and the surrogate time series is computed. A statistical test of a detected trend between the time series of observables and the surrogate time series is computed to determine if the detected trend occurred by chance. Finally, an early warning signal of the detected trend occurring by chance is generated.

18 Claims, 6 Drawing Sheets

(56) References Cited

PUBLICATIONS

Crucitti, P.; Latora, V. & Marchiori, M., Model for Cascading Failures in Complex Networks, Phys. Rev. E, 2004, 69, 045104.

Erdos, P. & Rényl, A., On Random Graphs, I., Publicationes Mathamaticae, 1959, 6, 290-297.

Kinney, R.; Crucitti, P.; Albert, R. & Latora, V., Modeling Cascading Failures in the North American Power Grid, Eur. Phy. J. B, 2005, 46, 101-107.

Moon, H. and Lu, T-C, Early Warning Signals of Complex Systems: Network Spectrum and Critical Transition, Workshop on Information in Networks, WIN 2010.

Riordan, O. & Warnke, L., Achlioptas Process Phase Transitions are Continuous, 2011, arXiv:1102.5306v2.

Scheffer, M.; Bascompte, J.; Brock, W. A.; Brovkin, V.; Carpenter, S. R.; Dakos, V.; Held, H.; van Nes, E. H.; Rietkerk, M. & Sugihara, G., Early Warning Signals for Critical Transitions, Nature, 2009, 461, 53-59.

Schreiber, T., Measuring Information Transfer, in Phys. Rev. Lett., 2000.

Lizier, J. T., The Local Information Bynamics of Distributed Computation in Complex Systems, Ph.D. thesis, University of Sidney, 2010.

M. Scheffer, J. Bascompte, W.A. Brock, V. Brovkin, S.R. Carpenter, V. Dakos, H. Held, E.H. van Nes, M. Rietkerk & G. Sugihara, Early-warning signals for citical transitions. Nature, 461: 53-59,2009.

V. Dakos, E. H. van Nes, R. Donangelo, H. Fort, and M. Scheffer (in press). Spatial correlation as leading indicator of catastrophic shifts. Theoretical Ecology, 2009.

J. A. Almendral and A. Diaz-Guilera, Dynamical and spectral properties of complex networks, New J. Phys 9 187, 2007.

V. Guttal and C. Jayaprakash, Spatial variance and spatial skewness: leading indicators of regime shifts in spatial ecological systems, Theoretical Ecology, 2009.

P. N. McGraw and M. Menzinger, Analysis of nonlinear synchronization dynamics of oscillator networks by Laplacian spectral methods, Physical Review E 75, 2007.

L.M. Pecora and T.L. Carroll, Master Stability Functions for Synchronized Coupled Systems, Phys. Rev. Lett. 1998.

D. Harmon, M De Aguitar, D. Chinellato, D. Braha, R.R. Epstein, and Y. Bar-Yam, Predicting economic mmarket crises using measures of collective panic, Arxiv.org, 2011.

J. A. Almendral and A. Diaz-Guilera, Dynamical and spectral properties of complex networks, New J. Phys. 9 187, 2007.

Banerjee, L. E. Ghaoui and A. D'Aspremont, Model Selection through Sparse Maximum Liklehood Estimation for Multivariate Gaussian or Binary Data. Journal of Machine Learning Research, 9:485-516, 2008.

Bolstad, B. D. V. Veen, and R. Nowak. Causal Network Inference via Group Sparse Regularization. IEEE Transation on Signal Processing, 59(6):2628-2641, 2011.

G. L. Clark. Critical problems of geographical unemployment models, Progress in Human Geography, 1980.

V. Dakos, E. H. Nes, R. Donangelo, H. Fort, and M. Scheffer. Spatial correlation as leading indicator of catastrophic shifts. Theoretical Ecology, 3(3):163-174, Nov. 2009.

V. Dakos, M. Scheffer, E. H. van Nes, V. Brovkin, V. Petoukhov, and H. Held. Slowing Down as an Early Warning Signal for Abrupt Climate Change. Proceedings of the National Academy of Sciences of the United States of America, 105(38):14308-12, Sep. 2008.

D. J. Fenn, M. A. Porter, S. Williams, M. Mcdonald, N. F. Johnson, and N. S. Jones. Temporal Evolution of Financial Market Correlations. ArXiv, pp. 1-15, 2011.

D. K. Fool and W. J. Milne, Net migration estimation in an extended, multiregional gravity model. Journal of regional science, 24(1);119-33. Feb. 1984.

J. Friedman, T. Hastie, and R. Tibshirani. Sparse inverse covariance estimation with the graphical lasso. Biostatistics (Oxford, England), 9(3):432-41, Jul. 2008.

R. M. May, S. A. Levin, and G. Sugihara. Ecology for Bankers. Nature, 451(February):893-895, 2008.

P. E. McSharry, L. a, Smith, and L. Tarassenko, Prediction of epileptic seizures: are nonlinear methods relevant? Nature medicine, 9(3):241-2: author reply 242, Mar. 2003.

H. Moon and T.-C. Lu, Early warning signal of complex systems: Network spectrum and critical transitions. Workshop on Information in Networks, Apr. 2010.

Moran. Notes on Continuous Stochastic Phenomena. Biometrica, 37(1):17-23, 1950.

M. Schaffer, J. Bascompte, W. a. Brock, V. Brovkin, S. R. Carpenter, V. Dakos, H. Held, E. H. van Nes, M. Rietkerk, and G. Sugihara. Early-warning signals for critical transitions. Nature, 461(7260):53-9, Sep. 2009.

M. Scheffer and S. R. arpenter. Catastrophic regime shifts in ecosystems: linking theory to observation. Trends in Ecology & Evolution, 18(12):648-656, Dec. 2003.

Stomakhin, M. B. Short, and L. Bertozzi. Reconstruction of Missing Data in Social Networks Based on Temporal Patterns of Interactions, 2011.

H. van Nes and M. Scheffer, Implications of Spatial Heterogeneity for Catastrophic Regime Shifts in Ecosystems. Ecology, 86(7):1797-1807, Jul. 2005.

L.M. Pecora and T.L. Carroll, Master Stability Functions for Synchronized Coupled Systems, Phys. Rev. Lett. 1998.

J. Yu, V. A. Smith, P. P. Wang, A. J. Hartemink, and E. D. Jarvis. Advances to Bayesian network inference for generating causal networks from observational biological data. Bioinformatics (Oxford, England), 20(18):3594-603, Dec. 2004.

N. L. Zhang and D. Poole. Exploiting Causal Independence in Bayesian Network Inference. Artificial Intelligence, 5:301-328, 1996.

Ryan Compton, Hankyu Moon and Tsai-Ching Lu, \Catastrophe prediction via estimated network autocorrelation, WIN Workshop on Information in Networks, Sep. 2011.

* cited by examiner

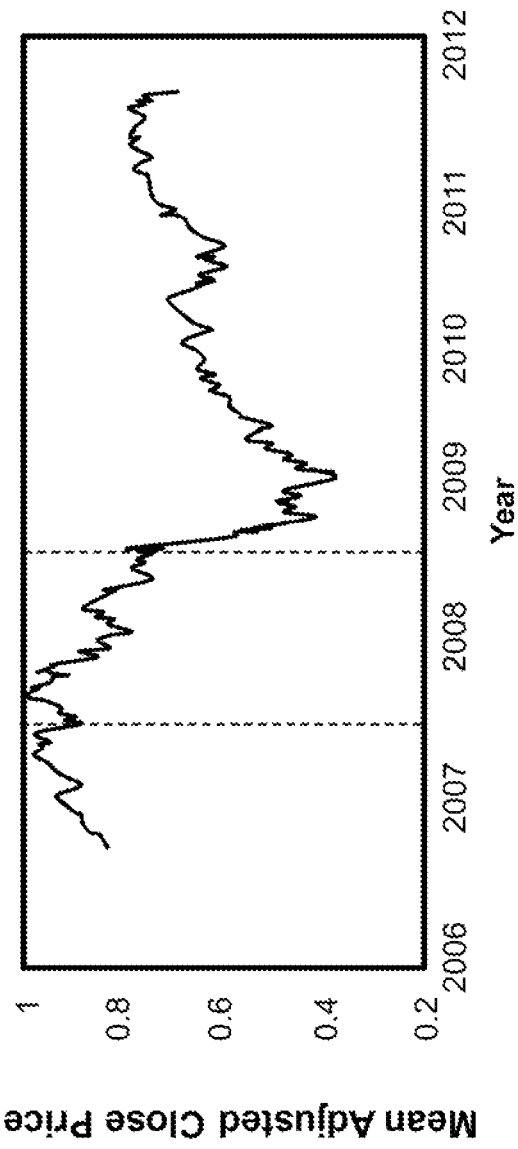
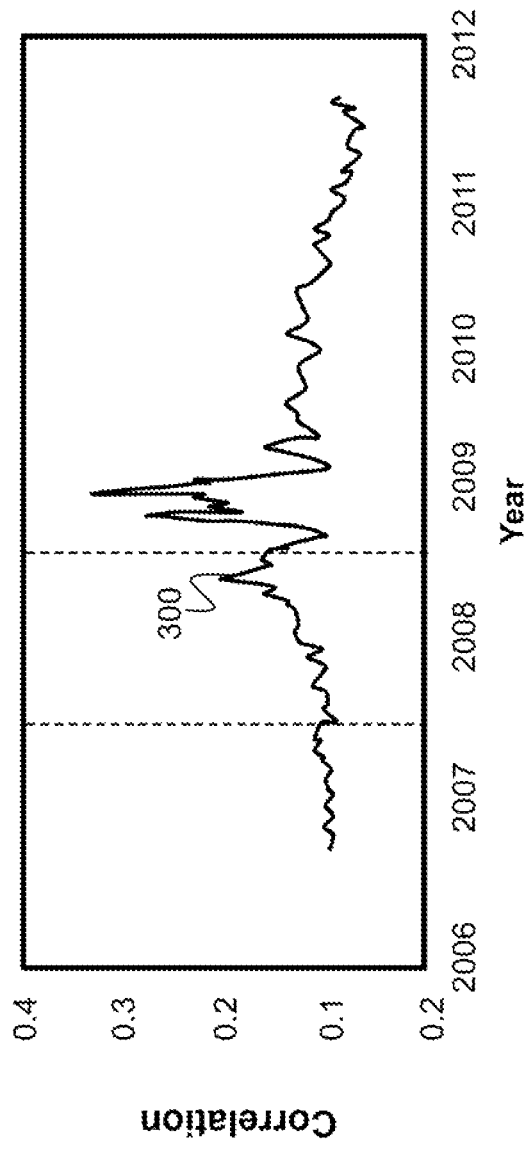
FIG. 3A
FIG. 3B

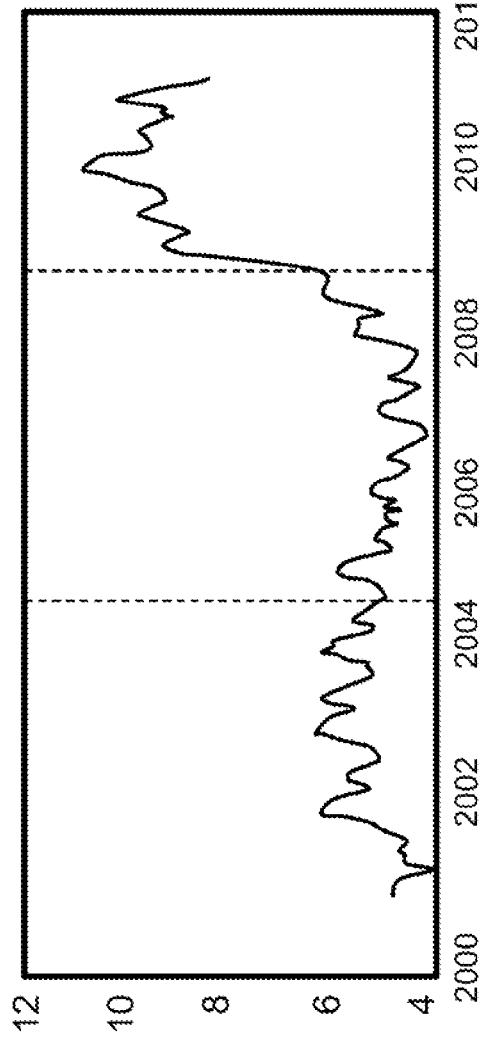
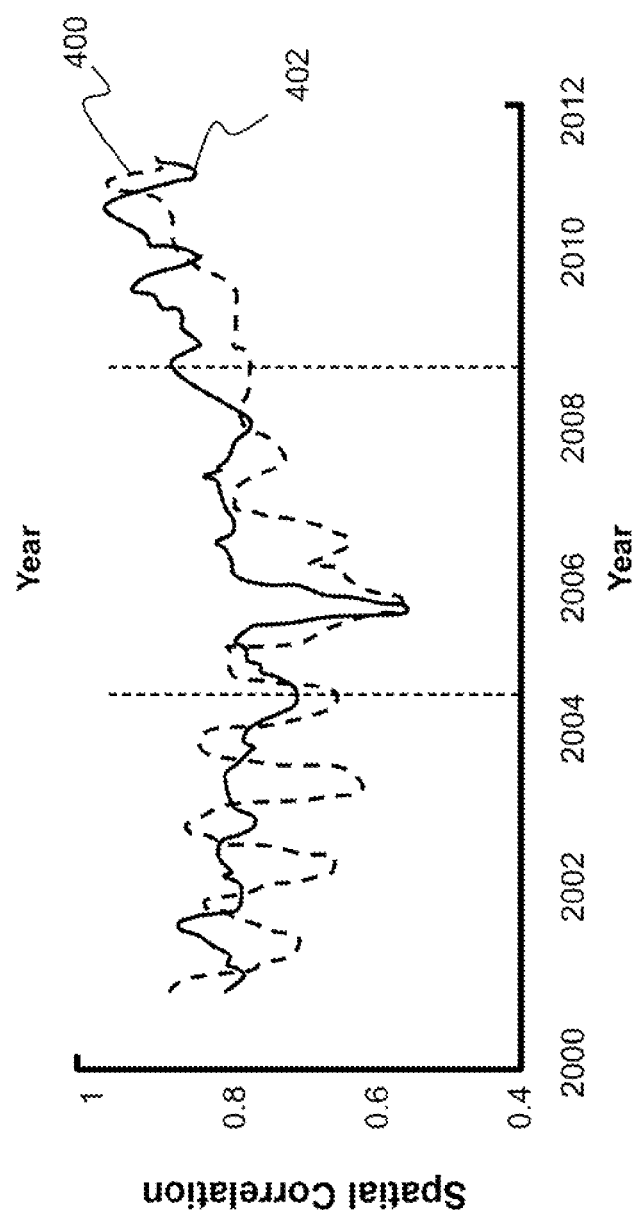
FIG. 4A
FIG. 4B

CATASTROPHE PREDICTION VIA ESTIMATED NETWORK AUTOCORRELATION

CROSS-REFERENCE TO RELATED APPLICATIONS

This is a Non-Provisional patent application of U.S. Provisional Application No. 61/589,786, filed in the United States on Jan. 23, 2012, titled, "Catastrophe Prediction via Estimated Network Autocorrelation."

This is also a Non-Provisional patent application of U.S. Provisional Application No. 61/590,391, filed in the United States on Jan. 25, 2012, titled, "System and Methods for Cascading Failures Detection, Identification. and Mitigation."

This is ALSO a Non-Provisional patent application of U.S. Provisional Application No. 61/589,634, filed in the United States on Jan. 23, 2012, titled, "Early Warning Signals of Complex Systems."

BACKGROUND OF THE INVENTION (1) Field of Invention

The present invention relates to a system for catastrophe prediction and, more particularly, to a system for catastrophe prediction via estimated network autocorrelation.

(2) Description of Related Art

The dynamics of complex systems as they approach a tipping point is an important area of study, as gradual, hard to detect changes in equilibria may suddenly induce catastrophic systemic shifts such as economic collapses, epileptic shocks, and climate changes. Warning signals for when these transitions become imminent are therefore extremely desirable.

Very little work has been done toward making predictions of critical transitions. In the most notable reference by Scheffer et al. (see the List of Cited Literature References, see Literature Reference No. 16), two forms of early warning signals (EWSs) were proposed: increased temporal correlation and increased spatial correlations of the system states. Dakos et al. (see Literature Reference No. 5) primarily focused on the increased spatial correlation as a better leading indicator of approaching critical transitions. Furthermore, Guttal et al. (see Literature Reference No. 10) proposed the skewness of the spatial statistics of the system behavior as another viable EWS.

Gradual, hard to detect changes in equilibria may suddenly induce catastrophic systemic shifts such as economic collapse (see Literature Reference No. 11), epileptic shock (see Literature Reference No. 13), and climate change (see Literature Reference No. 6). Warning signals for when these transitions become imminent are, therefore, extremely desirable. Observation of the phenomenon known as critical slowing down has recently successfully served as a warning signal in many bifurcating ecological systems (see Literature Reference No. 17). A system destabilizing through critical slow down exhibits a decreased recovery rate from small perturbations, a property quantifiable through increased time autocorrelation (see Literature Reference No. 16), spatial autocorrelation (see Literature Reference No. 19), and emergence of self-organizing patterns (see Literature Reference No. 5).

The early warning signal (EWS) of critical slowing down was proposed by Scheffer et al. (see Literature Reference No. 16) for simple one-node and two-node systems. Dakos et al. (see Literature Reference No. 5) further verified that spatial correlations increase for a 2500-node (50×50 spatial grid) coupled dynamical system. They compared the merits of temporal and spatial indicators under different system configurations and also verified that the spatial correlations of a strongly connected system increase more rapidly than a weakly connected system. Further, Guttal et al, (see Literature Reference No. 10) proposed the utility of changes in spatial skewness as another indicator of impending regime shifts, as well as the increased spatial correlations. However, these prior studies provide a basis for making predictions of approaching transition only in a qualitative manner (e.g., "a transition is coming"); they do not offer measures to make any quantitative predictions (e.g., "how soon will the transition happen?"). Additionally, these studies do not generalize to arbitrary interaction strengths between system nodes, because they model spatially arranged living systems whose interactions depend only on physical distances.

The studies above never take into account the non-homogeneous system connectivity structure observed in real world systems as a crucial factor in the process of analyzing the EWSs. The studies above either consider simple one-node or two-node systems, or multi-node spatial systems having homogeneous topographic connectivity between neighboring spatial nodes. Each of the aforementioned methods exhibit limitations that make them incomplete. Thus, a continuing need exists for a method with the capability to analyze wide ranges of complex systems that have varied degrees of interactions between system elements.

SUMMARY OF THE INVENTION

The present invention relates to a system for catastrophe prediction. The system comprises one or more processors and a memory having instructions such that when the instructions are executed, the one or more processors perform multiple operations. First, a time series of observables at a plurality of time steps is generated from data observed from a complex system. A surrogate time series is then generated based on the time series of observables. Inferred network structures are reconstructed for both the time series of observables and the surrogate time series. Next, spatial autocorrelation for each inferred network structure in both the time series of observables and the surrogate time series is computed. A statistical test of at least one detected trend between the time series of observables and the surrogate time series is then computed to determine if the at least one detected trend occurred by chance. Finally, an early warning signal of the at least one detected trend occurring by chance is generated.

In another aspect, $n_t$ samples of p-variate data observed from the complex system are used to generate the time series of observables according to the following:

$$u_t = f_c(u) + \alpha \Delta u + \sigma dw,$$

where $u \in R^p$ defines a state of the complex system at each time step, $\Delta$ is a graph laplacian, $\sigma dw$ corresponds to white noise scaled by $\sigma$, $\alpha \Delta u$ is a diffusion term responsible for internode communication, and $f_c(u)$ is a reaction term that governs the existence and stability of equilibria.

In another aspect, inferred network structures are reconstructed using a graphical lasso algorithm, wherein the graphical lasso algorithm affirms a weight W between a node i and a node j from an estimated inverse covariance matrix, $\Sigma^{-1}$, which is constructed as a solution to an optimization as follows:

$$\Sigma^{-1} = \arg\max_{\Theta \succeq 0} \log \det \Theta - tr(S\Theta) - \lambda |\Theta|_1,$$

where S is an empirical covariance matrix, det denotes determinant, tr denotes trace, $\Theta$ is the input to the function, arg max denotes the argument of the maximum, | | denotes absolute value, and $\lambda$ is a tuning parameter controlling a desired level, of sparsity in $\Sigma^{-1}$.

In another aspect, spatial autocorrelation is computed for each inferred network structure using Moran's I spatial autocorrelation given a p ×p matrix of edge weights, W, according to the following:

$$I = \frac{p}{\Sigma_{ij} W_{ij}} \frac{\Sigma_{ij} W_{ij}(u_i - \bar{u})(u_j - \bar{u})}{\Sigma_i (u_i - \bar{u})^2},$$

where u is a variable of interest, $\bar{u}$ is the mean of u, and i and j are nodes in the p ×p matrix.

In another aspect, the statistical test is Kendall's τ rank correlation.

In another aspect, the complex system is a bifurcating system.

As can be appreciated by one in the art, the present invention also comprises a method for causing a processor to perform the operations described herein.

Finally, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 3A illustrates the mean price of random sampled companies from the S&P 500 index according to the present invention;

FIG. 3B illustrates correlation over an inferred financial network according to the present invention;

FIG. 4A illustrates unemployment data for a U.S. metropolitan area according to the present invention;

FIG. 4B illustrates a comparison of spatial autocorrelation for unemployment data between a gravity model and an inferred network according to the present invention;

DETAILED DESCRIPTION

Figure 1:
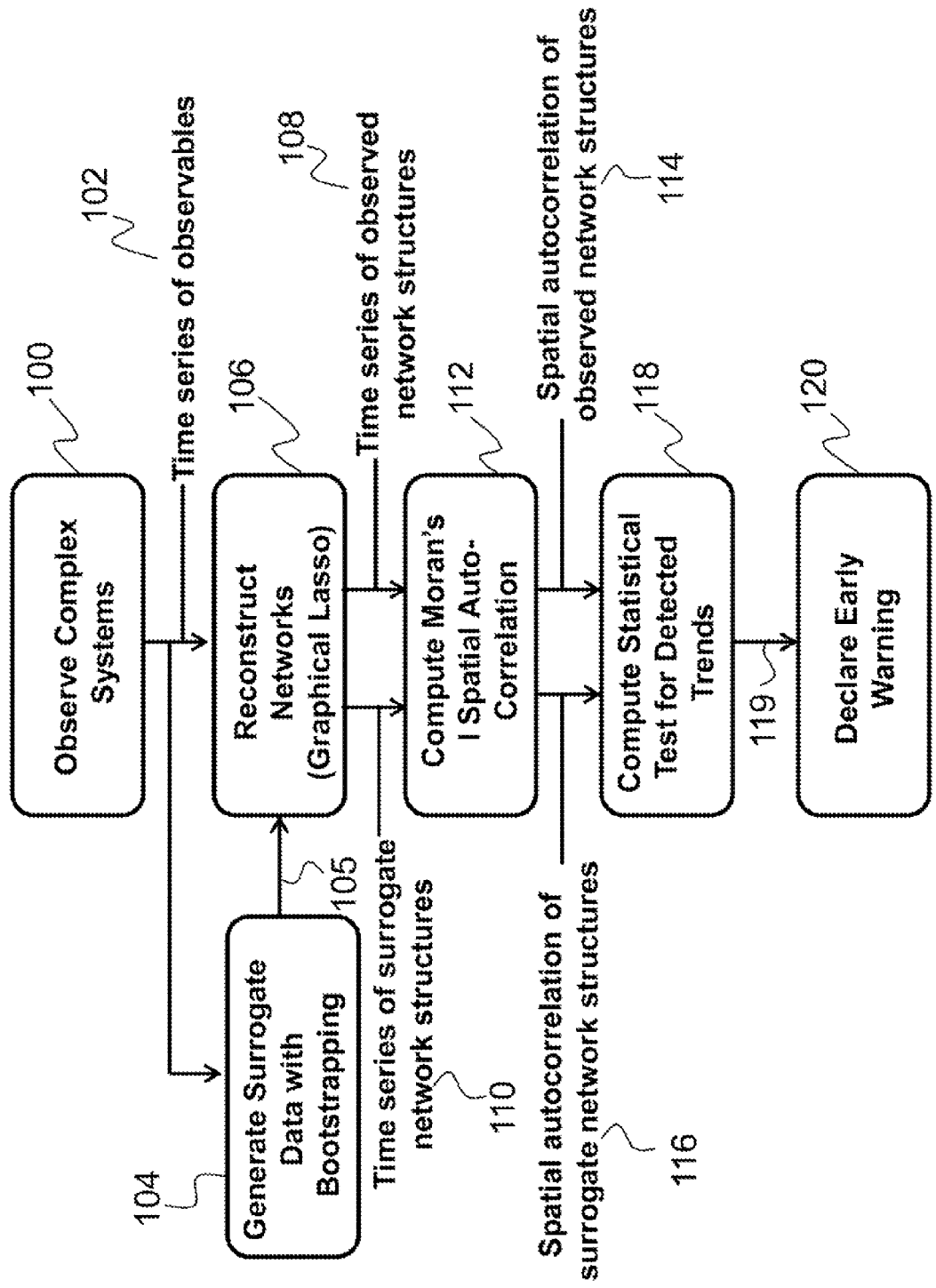
FIG. 1 is a flow diagram illustrating a method of catastrophe prediction using estimated network autocorrelation according to the present invention.

The present invention relates to a system for catastrophe prediction and, more particularly, to a system for catastrophe prediction via estimated network autocorrelation. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. J. A. Almendral and A. Diaz-Guilera, Dynamical and spectral properties of complex networks, New J. Phys, 9 187, 2007.
2. Banerjee, L. E. Ghaoui, and A. D'Aspremont. Model Selection through Sparse Maximum Likelihood Estimation for Multivariate Gaussian or Binary Data. Journal, of Machine Learning Research, 9:485-516, 2008.
3. Bolstad, B. D. V. Veen, and R. Nowak. Causal Network Inference Via Group Sparse Regularization. IEEE Transaction on Signal Processing, 59(6):2628-2641, 2011.
4. G. L. Clark, Critical problems of geographical unemployment models. Progress in Human Geography, 1980.
5. V. Dakos, E. H. Nes, R. Donangelo, H. Fort, and M. Scheffer. Spatial correlation as leading indicator of catastrophic shifts. Theoretical Ecology, 3(3):163-174, November 2009.

6. V. Dakos, M. Scheffer, E. H. van Nes, V. Brovkin, V. Petoukhov, and H. Held. Slowing Down As an Early Warning Signal For Abrupt Climate Change. Proceedings of the National Academy of Sciences of the United States of America, 105(38).14308-12, September 2008.
7. D. J. Fenn, M. A. Porter, S. Williams, M. Mcdonald, N. F. Johnson, and N. S. Jones. Temporal Evolution of Financial Market Correlations. arXiv, pages 1-15, 2011.
8. D. K. Foot and W. J. Milne. Net migration estimation in an extended, multiregional gravity model. Journal of regional science, 24(1)119-33, February 1984.
9. J. Friedman, T. Hastie, and R. Tibshirani. Sparse inverse covariance estimation with the graphical lasso. Biostatistics (Oxford, England), 9(3):432-41, July 2008.
10. V. Guttal and C. Jayaprakash, Spatial variance and spatial skewness: leading indicators of regime shifts in spatial ecological systems, Theoretical Ecology, 2009.
11. R. M. May, S. A. Levin, and G. Sugihara. Ecology for Bankers. Nature, 451(February):893-895, 2008.
12. P. N. McGraw and M. Menzinger, Analysis of nonlinear synchronization dynamics of oscillator networks by Laplacian spectral methods, Physical Review E 75, 2007.
13. P. E. McSharry, L. a. Smith, and L. Tarassenko. Prediction of epileptic seizures: are nonlinear methods relevant? Nature medicine, 9(3):241-2; author reply 242, March 2003.
14. H. Moon and T.-C. Lu. Early warning signal of complex systems: Network spectrum and critical transitions. Workshop on Information in Networks, April 2010.
15. Moran. Notes on Continuous Stochastic Phenomena. Biometrika, 37(1):17-23, 1950.
16. M. Scheffer, J. Bascompte, W. a. Brock, V. Brovkin, S. R. Carpenter, V. Dakos, H. Held, E. H. van Nes, M. Rietkerk, and G. Sugihara. Early-warning signals for critical transitions. Nature, 461(7260):53-9, September 2009.
17. M. Scheffer and S. R. Carpenter. Catastrophic regime shifts in ecosystems: linking theory to observation. Trends in Ecology & Evolution, 18(12):648-656, December 2003.
18. Stomakhin, M. B. Short, and L. Bertozzi. Reconstruction of Missing Data in Social Networks Based on Temporal Patterns of Interactions. 2011.
19. H. van Nes and M. Scheffer. Implications of Spatial Heterogeneity for Catastrophic Regime Shifts in Ecosystems. Ecology, 86(7):1797-1807, July 2005.
20. L. M. Pecora and T. L. Carroll, Master Stability Functions for Synchronized Coupled Systems, Phys. Rev, Lett. 1998.
21. J. Yu, V. A. Smith, P. P. Wang, A. J. Hartemink, and E. D. Jarvis. Advances to Bayesian network inference for generating causal networks from observational biological data. Bioinformatics (Oxford, England), 20(18):3594-603, December 2004.
22. N. L. Zhang and D. Poole. Exploiting Causal Independence in Bayesian Network Inference. Artificial Intelligence, 5:301-328, 1996.

(2) Principal Aspects

The present invention has three "principal" aspects. The first is a system for catastrophe prediction. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for catastrophe prediction. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Introduction

As will be described in further detail below, the present invention comprises a methodology for the prediction of critical transitions of complex systems. The method, referred to as estimated network autocorrelation, detects early warning signals of potential critical transitions by inferring a dynamic complex network and measuring spatial autocorrelation over it. The method makes it possible to detect upcoming state transitions and estimate the distance to transition, enabling measures to avoid or mitigate the adverse effects of such critical phenomena. Furthermore, the method allows for the detection of early warning signals with shorter time-series of observables, using estimated snapshot network structures of a complex system.

The theory of critical slowing down is employed as an early warning indicator in the present invention. As will be described in further detail below, the present invention provides a measurement of critical slow down in networks whose topology in unknown by calculating spatial autocorrelation over a topology inferred from observed time series data. As presented in detail below, the method was validated with synthetic experiments as well as datasets from financial markets during the 2008 stock market crash and the current U.S. unemployment crisis, suggesting that critical slow down may be observable in these systems. The method described herein is applicable to a wide range of complex dynamical systems that go through bifurcations, regardless of the scale or the specific dynamic evolution mechanisms of the system.

(4) Specific Details

A flow diagram depicting a method for catastrophe prediction via estimated network autocorrelation is illustrated in FIG. 1. In a first module 100, raw data observed from a user-selected complex system is collected as input. The first module 100 pre-processes the data to generate a multivariate time series of observables 102 as output.

A second module 104 takes as input the multivariate time series of observables 102 and generates a set of surrogate time series (represented by reference element 105) by applying a bootstrapping algorithm The set of surrogate time series 105 then serves as input to a third module 106.

In the third module 106, network structures are reconstructed using the graphical lasso algorithm (see Literature Reference No. 9). Inputs to the third module 106 include the multivariate time series of observables 102 and the set of surrogate time series 105. Network structures are reconstructed for these inputs, and the outputs are a time series of observed network structures 108 (reconstructed from the time series of observables 102) and a time series of surrogate network structures 110 (reconstructed from the set of surrogate time series 105), which serve as input to a fourth module 112.

In the fourth module 112, Moran's I spatial auto-correlation is computed at each point in time from the time series of observed network structures 108 and the time series of surrogate network structures 110. The computation results in spatial autocorrelation of observed network structures 114 and spatial autocorrelation of surrogate network structures 116.

In a fifth module 118, the system computes a statistical test (e.g., Kendall's τ rank correlation) of detected trends between observed and surrogate data (i.e., spatial autocorrelation of observed network structures 114 and spatial autocorrelation of surrogate network structures 116) to determine if the detected trends happened by chance. The output of the fifth module 118 is a univariate time series (represented by reference element 119).

Finally, in a sixth module 120, the input from the fifth module 118 (i.e., the univariate time series 119) is used in generation of an early warning for catastrophe prediction. When the value of the input from the fifth module 118 is above a problem-dependent threshold, a warning is declared. Each of the modules is described in detail below.

Specifically, in the first module 100 $n_t$ samples of p-variate data are taken for analysis to generate the time series of observables 102. The method of the present invention is applicable when dynamics observed in the first module 100 evolve over an unknown p-node graphical model evolve according to a reaction-diffusion equation as follows:

$$u_t = f_c(u) + \alpha \Delta + \sigma dw, \quad (1)$$

where $u \in R^p$ defines the state of the system at each time step, $\Delta$ is the graph laplacian with diffusion coefficient α, p is the number of nodes in the graphical model, and σdw corresponds to white noise scaled by the noise level, σ. Dynamics over an unknown p-node graphical model evolve according to a reaction-diffusion equation, and α is the diffusion coefficient. The diffusion term, αΔu, is solely responsible for inter-node communication, while the reaction term, $F_c^{(u)}$, governs the existence and stability of equilibria. Variations in $f_c$ are possible via manipulation of an external parameter, c, which may introduce instability. The noise term, σdw, kicks the system off unstable equilibria, possibly leading to catastrophic regime shifts.

Critical slow down was gauged prior to catastrophe by observing an increase in spatial autocorrelation measured via Moran's I at each time step. Given a p×p matrix of edge weights, W, Moran's I (see Literature Reference No. 15) is computed as:

$$I = \frac{p}{\Sigma_{ij} W_{ij}} \frac{\Sigma_{ij} W_{ij}(u_i - \bar{u})(u_j - \bar{u})}{\Sigma_i (u_i - \bar{u})^2}, \quad (2)$$

where u is a variable of interest, ū is the mean of u, and i and j are nodes in the p×p matrix. This computation, however, relies on knowledge of the weights underlying the topology, which is as of yet unspecified.

Therefore, in the third module 106, a graphical model was built from the time series data using the graphical lasso algorithm (see Literature Reference Nos. 2 and 9), as a non-limiting example. As can be appreciated by one skilled in the art, many other approaches to the graph reconstruction problem exist (see Literature Reference Nos. 18, 21, and 22). The graphical lasso algorithm was favored for its speed, simplicity, and ability to recover topology from few samples.

Briefly, the graphical lasso algorithm affirms a weight between node i and j From entries in the estimated inverse covariance matrix, $\Sigma^{-1}$, which is constructed as the solution to the following optimization:

$$\Sigma^{-1} = \arg\max_{\Theta \geq 0} \log \det \Theta - tr(S\Theta) - \lambda |\Theta|_1, \quad (3)$$

where S is the empirical covariance matrix, det denotes determinant, tr denotes trace, θ is the input to the function, arg max denotes the argument of the maximum, || denotes absolute value, and λ is a tuning parameter controlling the desired level of sparsity in $\Sigma^{-1}$. The first two terms are the classical maximum likelihood estimate while the $l_1$ (L1-norm) induced sparsity penalty often greatly improves the accuracy of the method (see Literature Reference No. 3). Upon completion of this optimization, $W = \Sigma^{-1}$ was set, and Moran's I was computed for each snapshot of the network in the fourth module 112. Trends in Moran's I were measured with Kendall's τ rank correlation (in the filth module 118) between the data and an ordered sequence of the same size. Kendall's τ rank correlation is a statistic used to measure the association between two measured quantities. Bootstrapping the above analysis showed trends to be significant. Specifically, 100 surrogate time series were created by randomly shuffling prebifurcation residual time series and computing trend statistics on the shuffled series (see Literature Reference No. 6). The shuffled (surrogate) series showed no notable increase in Moran's I prior to catastrophe. In FIG. 1, the second module 104, the time series of surrogate network structures 110, and the fifth module 118 depict the analysis of the shuffled (surrogate) time series which is used as a comparison against an observed time series to declare a warning when the value of the comparison (e.g., Kendall's τ rank correlation) is above a problem-dependent threshold.

For a demonstration of an early warning on a well understood system, a supercritical pitchfork bifurcation was simulated over a network of cities in Minnesota with edges defined by connecting highways. The following equation was solved:

$$u_t = c(t)u - u3 + \Delta u + \sigma dw \quad (4)$$

for $n_t = 3000$ time steps with $c(t) = \tanh(10t/n_t - 10)$ and σ=0.2. The timestep in the backward Euler scheme was dt=0.015. Equation (4) has one stable equilibrium at u=0 for c<0 and two stable equilibria at u=±1 for c>0. The described prediction focuses on a p=50 node subset of the map, as shown in FIGS. 2A and 2B.

Figure 2A:
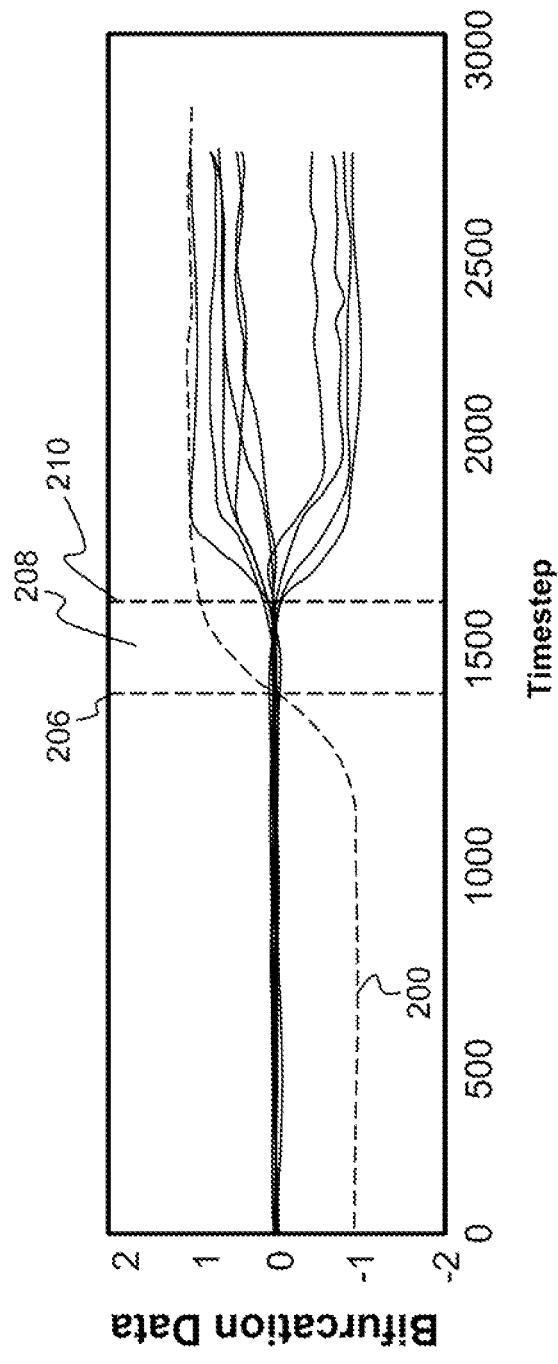
FIG. 2A illustrates a bifurcation predictor for simulation data according to the present invention.
Figure 2B:
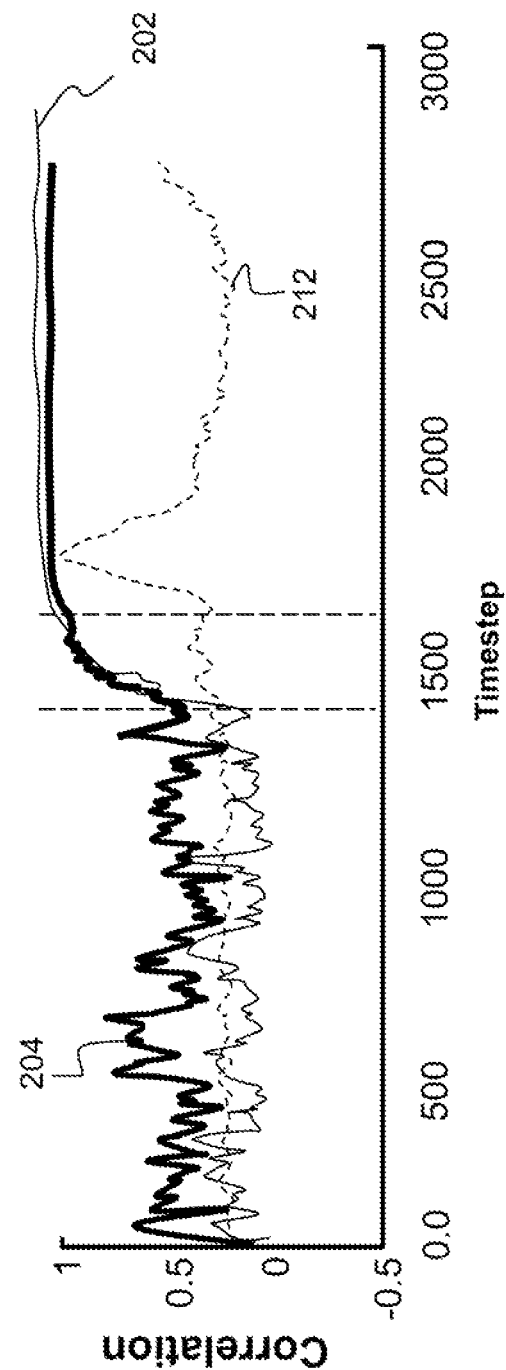
FIG. 2B illustrates a correspondence predictor for simulation data according to the present invention.

Specifically, FIGS. 2A and 2B illustrate bifurcation (FIG. 2A) and correspondence (FIG. 2B) predictors (which are dimensionless quantities) for the simulation data described above. The bifurcation parameter is plotted with the curved, dashed line 200 in FIG. 2A. In FIG. 2B, Moran's I is represented by a solid line 202 for the reconstructed network (λ=0.01, Kendall τ=0.93), and a bold solid line 204 represents the ground truth topology ($W_{ij}$=1 if connected; 0, otherwise, Kendall τ=0. 8624). As shown in FIG. 2A, the bifurcation known to happen at timestep (t)=1412, is indicated b the left vertical dashed line 206. Kendall τ is computed in the post-bifurcation, pre-catastrophe region 208 between the vertical dashed lines 206 and 210. The bifurcation parameter, c, (represented by the curved, dashed line 200) varies according to tanh. At the bifurcation, c=0 (as indicated on the y-axis of FIG. 2A), self organization becomes apparent through increased autocorrelation before catastrophic shifts (i.e., lines parting in various directions in FIG. 2A) in the system occur.

In recent years, there have been several catastrophes in financial systems. To simulate a financial network using the present invention, p=50 companies were randomly selected from the Standard & Poor's (S&P) 500 index and their daily adjusted closing prices were sampled between Oct. 10, 2006 and Aug. 5, 2011 ($n_t$ =1215). A network in accordance with the present invention was reconstructed with λ=0.006. Correlation over the inferred financial network is illustrated in FIGS. 3A and 3B.

The mean price of random sampled companies from the S&P 500) index is represented in FIG. 3A, while Moran's I over the inferred network is shown in FIG. 3B. Comparing FIG. 3A and FIG. 3B, an increase (Kendall τ=0.51) in spatial correlation 300 is observable before the crash of 2008. During the crash, all prices correlate well with each other over the reconstructed network. The recovery happens more slowly with the prices moving more independently during this timeframe. Related analyses of correlation have produced similar results (see Literature Reference No. 7). This suggests that models incorporating critical slowing down may be of value to the financial community, In addition to the stock market crash of 2008, an unusually large and steep increase in U.S. unemployment has occurred in recent years. To test catastrophe prediction using the present invention, monthly unemployment data in U.S. metropolitan areas was evaluated over the timeframe from January 2001 to August 2011, as shown in FIGS. 4A and 4B. Unemployment data is shown in FIG. 4A. In FIG. 4B, a comparison of autocorrelation for a gravity model (dashed line 400; Kendall τ=0.45) and autocorrelation of an inferred network (solid line 402; Kendall τ=0.43) generated with the present invention is illustrated. Moran's I with a weight matrix defined by the inverse distance between metropolitan areas, $W_{ij}=1/d_{ij}$, as well as an inferred network (λ=0.01) were computed. While the geographic "gravity model" (see Literature Reference No. 8) may be intuitive, such models have been questioned by the economic community (see Literature Reference No. 4), thereby motivating the development of an alternative network as described in the present invention. Note that both models show an increase in spatial autocorrelation before the current unemployment crisis indicating that a tipping point may have been crossed, as shown in FIG. 4B.

Figure 5:
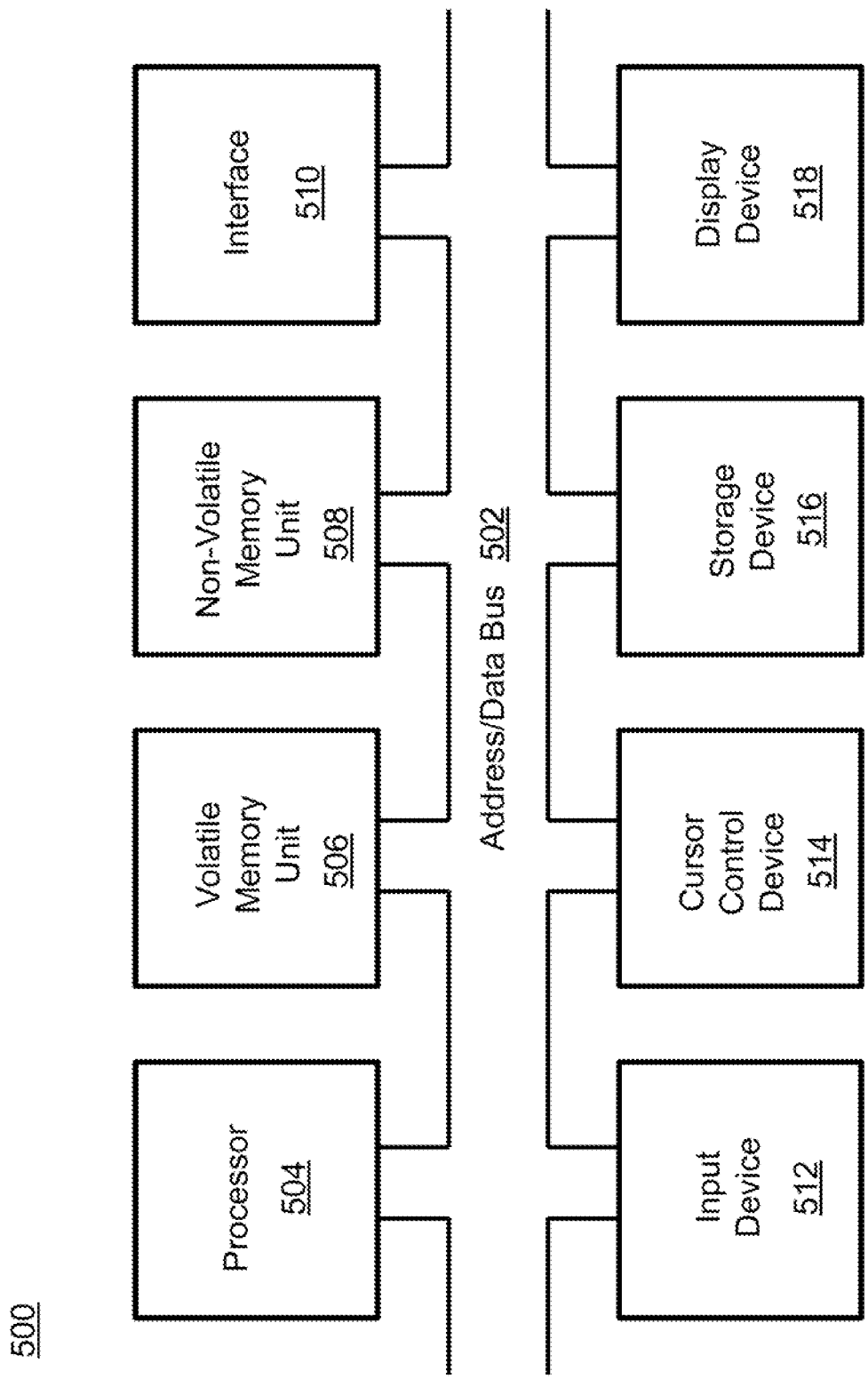
FIG. 5 is an illustration of a data processing system according to the present invention.

An example of a computer system 500 in accordance with one aspect is shown in FIG. 5. The computer system 500 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 500. When executed, the instructions cause the computer system 500 to perform specific actions and exhibit specific behavior, such as described herein.

The computer system 500 may include an address/data bus 502 that is configured to communicate information. Additionally, one or more data processing units, such as a processor 504, are coupled with the address/data bus 502. The processor 504 is configured to process information and instructions. In one aspect, the processor 504 is a microprocessor. Alternatively, the processor 504 may be a different type of processor such as a parallel processor, or as field programmable gate array.

The computer system 500 is configured to utilize one or more data storage units. The computer system 500 may include a volatile memory unit 506 (e.g., random access memory ("RAM"), static RAM, dynamic RAM, etc.) coupled with the address/data bus 502, wherein a volatile memory unit 506 is configured to store information and instructions for the processor 504. The computer system 500 further may include a non-volatile memory unit 508 (e.g., read-only memory ("ROM"), programmable ROM ("PROM"), erasable programmable ROM ("EPROM"), electrically erasable programmable ROM "EEPROM"), flash memory, etc.) coupled with the address/data. bus 502, wherein the non-volatile memory unit 508 is configured to store static information and instructions for the processor 504. Alternatively, the computer system 500 may execute instructions retrieved from an online data storage unit such as in "Cloud" computing. In an embodiment, the computer system 500 also may include one or more interfaces, such as an interface 510, coupled with the address/data bus 502. The one or more interfaces are configured to enable the computer system 500 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

in one aspect, the computer system 500 may include an input device 512 coupled with the address/data bus 502, wherein the input device 512 is configured to communicate information and command selections to the processor 500. In accordance with one aspect, the input device 512 is an alphanumeric input device, such as a keyboard, that may include alphanumeric and/or function keys. Alternatively, the input device 512 may be an input device other than an alphanumeric input device. In one aspect, the computer system 500 may include a cursor control device 514 coupled with the address/data bus 502, wherein the cursor control device 514 is configured to communicate user input information and/or command selections to the processor 500. In one aspect, the cursor control device 514 is implemented using a device such as a mouse, a track-ball, a track-pad, an optical tracking device, or a touch screen. The foregoing notwithstanding, in one aspect, the cursor control device 514 is directed and/or activated via input from the input device 512, such as in response to the use of special keys and key sequence commands associated with the input device 512. In an alternative aspect, the cursor control device 514 is configured to be directed or guided by voice commands In one aspect, the computer system 500 further may include one or more optional computer usable data storage devices, such as a storage device 516, coupled with the address/data bus 502. The storage device 516 is configured to store information and/or computer executable instructions. In one aspect, the storage device 516 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 518 is coupled with the address/data bus 502, wherein the display device 518 is configured to display video and/or graphics. In one aspect, the display device 518 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 500 presented herein is an example computing environment in accordance with one aspect. However, the non-limiting example of the computer system 500 is not strictly limited to being a computer system. For example, one aspect provides that the computer system 500 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 6:
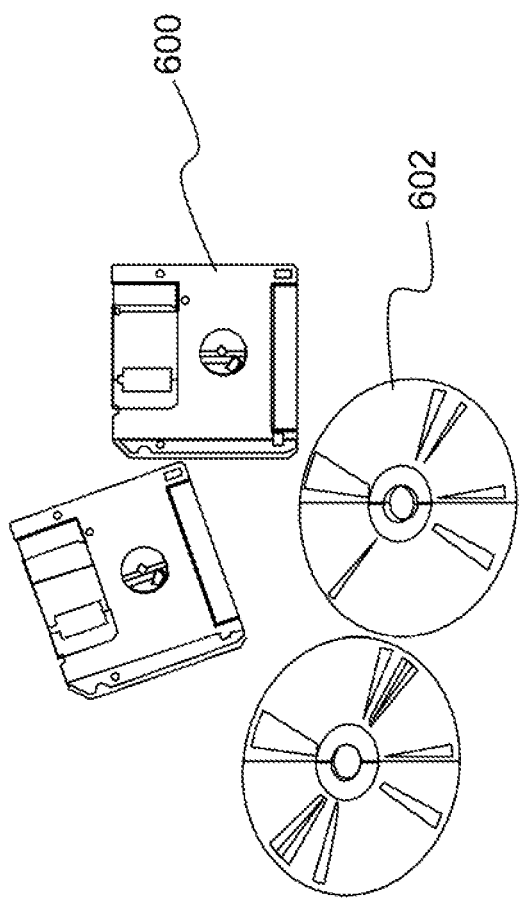
FIG. 6 is an illustration of a computer program product according to the present invention.

An illustrative diagram of a computer program product embodying the present invention is depicted in FIG. 6. As a non-limiting example, the computer program product is depicted as either a floppy disk 600 or an optical disk 602. However, as mentioned previously, the computer program product generally represents computer readable code (i.e., instruction means or instructions) stored on any compatible non-transitory computer readable medium.

What is claimed is:

1. A system for catastrophe prediction, the system comprising:
   one or more processors and a non-transitory memory having instructions such that when the instructions are executed, the one or more processors perform operations of:
      generating a time series of observables at a plurality of time steps from data observed from a complex system;
      generating a surrogate time series based on the time series of observables;
      reconstructing inferred network structures for both the time series of observables and the surrogate time series;
      computing spatial autocorrelation for each inferred network structure in both the time series of observables and the surrogate time series;
      computing a statistical test of at least one detected trend between the time series of observables and the surrogate time series to determine if the at least one detected trend occurred by chance; and
      generating an early warning signal of the at least one detected trend occurring by chance.

2. The system as set forth in claim 1, wherein the one or more processors further perform an operation of analyzing $n_t$ samples of p-variate data observed from the complex system to generate the time series of observables according to the following:

$$u_t = f_c(u) + \alpha \Delta + \sigma dw,$$

where $u \in R^p$ defines a state of the complex system at each time step, $\Delta$ is a graph laplacian, $\sigma dw$ corresponds to white noise scaled by $\sigma$, $\alpha \Delta u$ is a diffusion term responsible for internode communication, and $f_c(u)$ is a reaction term that governs the existence and stability of equilibria.

3. The system as set forth in claim 2, wherein the one or more processors further perform an operation of reconstructing inferred network structures using a graphical lasso algorithm, wherein the graphical lasso algorithm affirms a weight W between a node i and a node j from an estimated inverse covariance matrix, $\Sigma^{-1}$, which is constructed as a solution to an optimization as follows:

$$\Sigma^{-1} = \arg\max_{\Theta \succeq 0} \log \det \Theta - tr(S\Theta) - \lambda |\Theta|_1,$$

where S is an empirical covariance matrix, det denotes determinant, tr denotes trace, $\theta$ is the input to the function, arg max denotes the argument of the maximum, || denotes absolute value, and $\lambda$ is a tuning parameter controlling a desired level of sparsity in $\Sigma^{-1}$.

4. The system as set forth in claim 3, wherein the one or more processors further perform an operation of computing spatial autocorrelation for each inferred network structure using Moran's I spatial autocorrelation given a p×p matrix of edge weights, W, according to the following:

$$I = \frac{p}{\Sigma_{ij} W_{ij}} \frac{\Sigma_{ij} W_{ij}(u_i - \bar{u})(u_j - \bar{u})}{\Sigma_i (u_i - \bar{u})^2},$$

where u is a variable of interest, $\bar{u}$ is the mean of u, and i and j are nodes in the p×p matrix.

5. The system as set forth in claim 4, wherein the statistical test is Kendall's $\tau$ rank correlation.

6. The system as set forth in claim 1, wherein the complex system is a bifurcating system.

7. A computer-implemented method for catastrophe prediction, comprising:
   an act of causing a data processor to execute instructions stored on a non-transitory memory such that upon execution, the data processor performs operations of:
      generating a time series of observables at a plurality of time steps from data observed from a complex system;
      generating a surrogate time series based on the time series of observables;
      reconstructing inferred network structures for both the time series of observables and the surrogate time series;
      computing spatial autocorrelation for each inferred network structure in both the time series of observables and the surrogate time series;
      computing a statistical test of at least one detected trend between the time series of observables and the surrogate time series to determine if the at least one detected trend occurred by chance; and
      generating an early warning signal of the at least one detected trend occurring by chance.

8. The method as set forth in claim 7, wherein the data processor further performs an operation of analyzing $n_t$ samples of p-variate data observed from the complex system to generate the time series of observables according to the following:

$$u_t = f_c(u) + \alpha \Delta + \sigma dw,$$

where $u \in R^p$ defines a state of the complex system at each time step, $\Delta$ is a graph laplacian, $\sigma dw$ corresponds to white noise scaled by $\sigma$, $\alpha \Delta u$ is a diffusion term responsible fur internode communication, and $f_c(u)$ is a reaction term that governs the existence and stability of equilibria.

9. The method as set forth in claim 8, wherein the data processor further performs an operation of reconstructing inferred network structures using a graphical lasso algorithm, wherein the graphical lasso algorithm affirms a weight W between a node i and a node j from an estimated inverse covariance matrix, $\Sigma^{-1}$, which is constructed as a solution to an optimization as follows:

$$\Sigma^{-1} = \arg\max_{\Theta \geq 0} \log \det \Theta - tr(S\Theta) - \lambda|\Theta|_1,$$

where S is an empirical covariance matrix, det denotes determinant, tr denotes trace, θ is the input to the function, arg max denotes the argument of the Maximum, || denotes absolute Value, and λ is a tuning parameter controlling a desired level of sparsity in $\Sigma^{-1}$.

10. The method as set forth in claim 9, wherein the data processor further performs an operation of computing spatial autocorrelation fur each inferred network structure using Moran's I spatial autocorrelation given a p×p matrix of edge weights, W, according to the following:

$$I = \frac{p}{\Sigma_{i,j} W_{i,j}} \frac{\Sigma_{i,j} W_{i,j}(u_i - \bar{u})(u_j - \bar{u})}{\Sigma_i(u_i - \bar{u})^2},$$

where u is a variable of interest, $\bar{u}$ is the mean of u, and i and j are nodes in the p×p matrix.

11. The method as set forth in claim 10, wherein the statistical test is Kendall's τ rank correlation.

12. The method as set forth in claim 7, wherein the complex system is a bifurcating system.

13. A computer program product for catastrophe prediction, the computer program product comprising computer-readable instructions stored on a non-transitory computer-readable medium that are executable by a computer having a processor for causing the processor to perform operations of:
- generating a time series of observables at a plurality of time steps from data observed from a complex system;
- generating a surrogate time series based on the time series of observables;
- reconstructing inferred network structures for both the time series of observables and the surrogate time series;
- computing spatial autocorrelation for each inferred network structure in both the time series of observables and the surrogate time series;
- computing a statistical test of at least one detected trend between the time series of observables and the surrogate time series to determine if the at least one detected trend occurred by chance; and
- generating an early warning signal of the at least one detected trend occurring by chance.

14. The computer program product as set forth in claim 13, further comprising instructions for causing the processor to perform an operation of analyzing $n_t$ samples of p-variate data observed from the complex system to generate the time series of observables according to the following:

$$u_t = f_c(u) + \alpha\Delta + \sigma dw,$$

where $u \in R^p$ defines a state of the complex system at each time step, Δ is a graph laplacian, σdw corresponds to white noise scaled by σ, αΔu is a diffusion term responsible for internode communication, and $f_c(u)$ is a reaction term that governs the existence and stability of equilibria.

15. The computer program product as set forth in claim 14, further comprising instructions for causing the processor to perform an operation of reconstructing inferred network structures using a graphical lasso algorithm, wherein the graphical lasso algorithm affirms a weight W between a node i and a node j from an estimated inverse covariance matrix, $\Sigma^{-1}$, which is constructed as a solution to an optimization as follows:

$$\Sigma^{-1} = \arg\max_{\Theta \geq 0} \log \det \Theta - tr(S\Theta) - \lambda|\Theta|_1,$$

where S is an empirical covariance matrix, det denotes determinant, tr denotes trace, θ is the input to the function, arg max denotes the argument of the maximum, || denotes absolute value, and λ is a tuning parameter controlling a desired level of sparsity in $\Sigma^{-1}$.

16. The computer program product as set forth in claim 15, further comprising instructions for causing the processor to perform an operation of computing spatial autocorrelation for each inferred network structure using Moran's I spatial autocorrelation given a p×p matrix of edge weights, W, according to the following:

$$I = \frac{p}{\Sigma_{i,j} W_{i,j}} \frac{\Sigma_{i,j} W_{i,j}(u_i - \bar{u})(u_j - \bar{u})}{\Sigma_i(u_i - \bar{u})^2},$$

where u is a variable of interest, $\bar{u}$ is the mean of u, and i and j are nodes in the p×p matrix.

17. The computer program product as set forth in claim 16, wherein the statistical test is Kendall's τ rank correlation.

18. The computer program product as set forth in claim 13, wherein the complex system is a bifurcating system.

\* \* \* \* \*